(12) United States Patent
Shioya et al.

(10) Patent No.: US 8,217,973 B2
(45) Date of Patent: Jul. 10, 2012

(54) EXPOSURE DEVICE FOR CONTROLLING LIGHT EMITTING ELEMENTS

(75) Inventors: Kohei Shioya, Ebina (JP); Atsushi Ugajin, Ebina (JP); Satoshi Kurashima, Ebina (JP); Tetsuya Hori, Ebina (JP); Tomoaki Sakita, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 357 days.

(21) Appl. No.: 12/561,745

(22) Filed: Sep. 17, 2009

(65) Prior Publication Data

US 2010/0245526 A1    Sep. 30, 2010

(30) Foreign Application Priority Data

Mar. 25, 2009    (JP) .................................. 2009-073080

(51) Int. Cl.
*B41J 2/435* (2006.01)
(52) U.S. Cl. ........................................ 347/224; 347/236
(58) Field of Classification Search .................. 315/291; 372/38.02; 430/48; 347/236, 224
See application file for complete search history.

(56) References Cited

U.S. PATENT DOCUMENTS

| | | | |
|---|---|---|---|
| 2005/0029965 A1* | 2/2005 | Yamaguchi et al. | 315/291 |
| 2006/0023761 A1* | 2/2006 | Moriyama | 372/38.02 |
| 2008/0220347 A1* | 9/2008 | Tomita et al. | 430/48 |
| 2010/0245527 A1* | 9/2010 | Sakita et al. | 347/224 |

FOREIGN PATENT DOCUMENTS

| | | |
|---|---|---|
| JP | 2000-114649 A | 4/2000 |
| JP | 2002-76504 A | 3/2002 |
| JP | 2006-278403 A | 10/2006 |

OTHER PUBLICATIONS

Notification of Reasons for Refusal, dated Feb. 1, 2011, in counterpart Japanese Application No. 2009-073080.

* cited by examiner

*Primary Examiner* — Stephen Meier
*Assistant Examiner* — Carlos A Martinez
(74) *Attorney, Agent, or Firm* — Sughrue Mion, PLLC

(57) ABSTRACT

An exposure device includes plural light-emitting elements, a light amount detection unit, a controller, plural holding units and a connection unit. The controller sequentially determines control values of the light-emitting elements based on comparison between the light amounts detected by the light amount detection unit and a predetermined reference value. The holding units are provided for the light-emitting elements, respectively. Each holding unit holds a control voltage of the controller. When the controller is to sequentially determine control values of a part of the plurality of light-emitting elements, the connection units connects the controller and the holding units corresponding to one or more light-emitting elements for which control values are determined earliest among the part of the plural light-emitting elements, before the controller determines the control values of the one or more light-emitting elements.

11 Claims, 13 Drawing Sheets

EXPOSURE DEVICE FOR CONTROLLING LIGHT EMITTING ELEMENTS

CROSS-REFERENCE TO RELATED APPLICATIONS

This application is based on and claims priority under 35 USC 119 from Japanese Patent Application No. 2009-73080 filed on Mar. 25, 2009.

BACKGROUND

Technical Field

The present invention relates to an exposure device, an image forming apparatus and a computer-readable medium storing a program that causes a computer to execute an exposure control process.

SUMMARY

An exposure device includes a plurality of light-emitting elements, a light amount detection unit, a controller, a plurality of holding units and a connection unit. The light amount detection unit detects light amounts of the light-emitting elements. The controller sequentially determines control values of the respective light-emitting elements based on comparison between the light amounts detected by the light amount detection unit and a predetermined reference value. The control values of the respective light-emitting elements are used to cause the respective light-emitting elements to emit light and carry out exposure. The plurality of holding units are provided for the light-emitting elements, respectively. Each holding unit holds a control voltage of the controller. When the controller is to sequentially determine control values of a part of the plurality of light-emitting elements, the connection units connects the controller and the holding units corresponding to one or more light-emitting elements for which control values are determined earliest among the part of the plurality of light-emitting elements, before the controller determines the control values of the one or more light-emitting elements.

BRIEF DESCRIPTION OF THE DRAWINGS

Exemplary embodiments of the invention will be described in detail below based on the accompanying drawings, wherein.

DETAILED DESCRIPTION

Hereinafter, exemplary embodiments of the present invention will be described.

First, an first exemplary embodiment of the present invention will be described.

Figure 1:
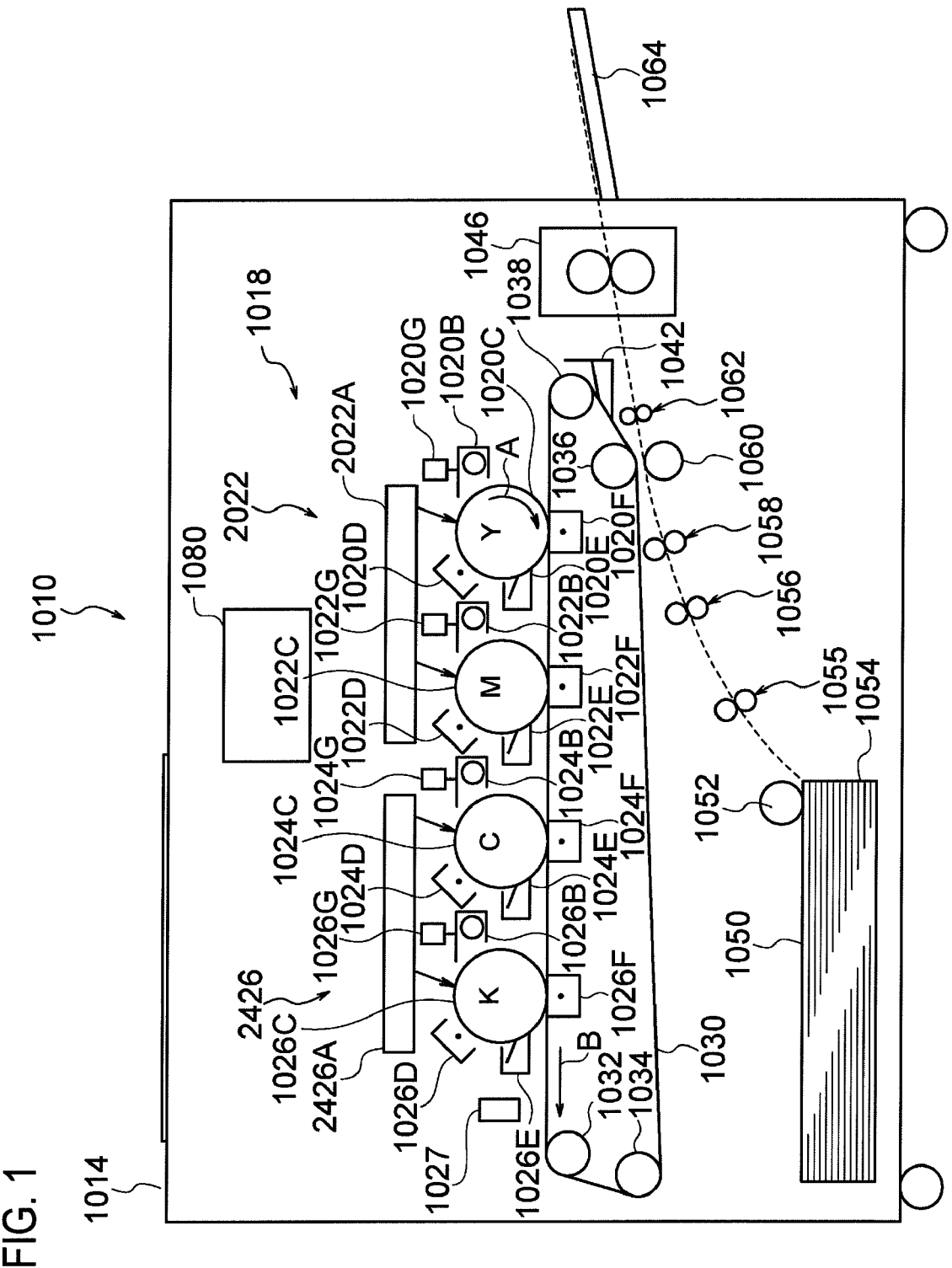
FIG. 1 is a schematic view showing the entire configuration of an image forming apparatus according to an first exemplary embodiment of the present invention.

FIG. 1 is a schematic view showing the entire configuration of an image forming apparatus 1010 according to this exemplary embodiment.

The image forming apparatus 1010 is covered by a casing 1014. The image forming apparatus 1010 includes an image forming section 1018 and an image processing control section 1080 in the interior of the casing 1014. The image forming section 1018 forms color images on sheets. The image processing control section 1080 controls the entirety of image processing in the image forming section 1018.

The image forming section 1018 includes an intermediate transfer body 1030, a YM image forming unit 2022, a CK image forming unit 2426, a sheet conveyance path, conveyance rollers and a fixing device 1046. The intermediate transfer body 1030 is a belt structure which travels around with being wound on rollers 1032, 1034, 1036 and 1038. The YM image forming unit 2022 forms a Y (yellow) color image and a M (magenta) color image. The CK image forming unit 2426 forms a C (cyan) color image and a K (black) color image. The YM image forming unit 2022 and the CK image forming unit 2426 are disposed in a tandem manner from the upstream side toward the downstream side along a conveyance direction (a direction of an arrow B shown in FIG. 1) of the intermediate transfer body 1030. The sheet conveyance path and conveyance rollers are configured to feed out a sheet 1050 from a sheet accommodation section 1054 and to convey the same. The fixing device 1046 performs a fixing process for the sheet onto which a toner image is transferred. Also, the image forming section 1018 includes a detection section 1027, serving as position detecting unit, on the downstream side of the CK image forming unit 2426 in the conveyance direction (the direction of the arrow B in FIG. 1).

The YM image forming unit 2022 is provided with an optical beam scanning device 2022A that is an exposure device common to Y and M colors. The optical beam scanning device 2022A emits Y-color laser light and M-color laser light which are modulated based on image data.

For the Y color, the YM image forming unit 2022 includes a photosensitive drum 1020C, a charging device 1020D, a developing device 1020B, a toner feeding part 1020G, a transfer device 1020F and a cleaning device 1020E. The charging device 1020D charges the photosensitive drum 1020C at a predetermined potential. The developing device 1020B develops a latent image formed by Y-color laser light output from the optical beam scanning device 2022A. The toner feeding part 1020G feeds a Y-color toner to the developing device 1020B. The transfer device 1020F transfers a yellow toner image from the photosensitive drum 1020C onto the intermediate transfer body 1030. The cleaning device 1020E removes toner from the outer circumferential surface of the photosensitive drum 1020C.

For the M color, the YM image forming unit 2022 includes a photosensitive drum 1022C, a charging device 1022D, a developing device 1022B, a toner feeding part 1022G, a transfer device 1022F and a cleaning device 1022E.

The CK image forming unit 2426 includes an optical beam scanning device 2426A serving as an exposure device common to C and K colors. The optical beam scanning device 2426A emits C-color laser light and K-color laser light, which are modulated based on image data.

For the C color, the CK image forming unit 2426 includes a photosensitive drum 1024C, a charging device 1024D, a developing device 1024B, a toner feeding part 1024G, a transfer device 1024F and a cleaning device 1024E. The charging device 1024D charges the photosensitive drum 1024C at a predetermined potential. The developing device 1024B develops a latent image formed by C-color laser light output by an optical beam scanning device 2426A. The toner feeding part 1024G feeds a C-color toner to the developing device 1024B. The transfer device 1024F transfers a C-color toner image from the photosensitive drum 1024C onto the intermediate transfer body 1030. The cleaning device 1024E removes toner from the outer circumferential surface of the photosensitive drum 1024C.

For the K color, the CK image forming unit 2426 includes a photosensitive drum 1026C, a charging device 1026D, a developing device 1026B, a toner feeding part 1026G, a transfer device 1026F and a cleaning device 1026E.

Scanning exposure of optical beams from the optical beam scanning device 2022A and the optical beam scanning device 2426A to the photosensitive drum 1020C, the photosensitive drum 1022C, the photosensitive drum 1024C and the photosensitive drum 1026C is carried out at predetermined intervals that are determined by a conveyance speed of the intermediate transfer body 1030 and distances between the photosensitive drum 1020C, the photosensitive drum 1022C, the photosensitive drum 1024C, and the photosensitive drum 1026C.

As shown in FIG. 1, a sheet accommodation section 1054 that accommodates sheets 1050 is provided below the intermediate transfer body 1030. An uppermost sheet 1050 of the sheet accommodation section 1054 is fed out to a sheet conveyance path by means of a feed-out roller 1052. A fed-out sheet 1050 is conveyed through the sheet conveyance path by the conveyance roller 1055, a conveyance roller 1056 and a conveyance roller 1058, and reaches the vicinity of the intermediate transfer body 1030.

A conveyance roller 1060 that faces the conveyance roller 1036 across the intermediate transfer body 1030 is provided on the sheet conveyance path. A color image that is formed by superimposing toner images of the respective colors on the intermediate 1030 is transferred onto the sheet 1050 when the sheet 1050 is conveyed through the facing part between the conveyance roller 1036 (in fact, the intermediate transfer body 1030) and conveyance roller 1060.

The sheet 1050 having the color image transferred thereon is conveyed to the fixing device 1046 by a conveyance roller 1062. After the sheet 1050 is subjected to the fixing process (heated and pressurized) by the fixing device 1046, the sheet 1050 is ejected to a sheet tray 1064.

Figure 2:
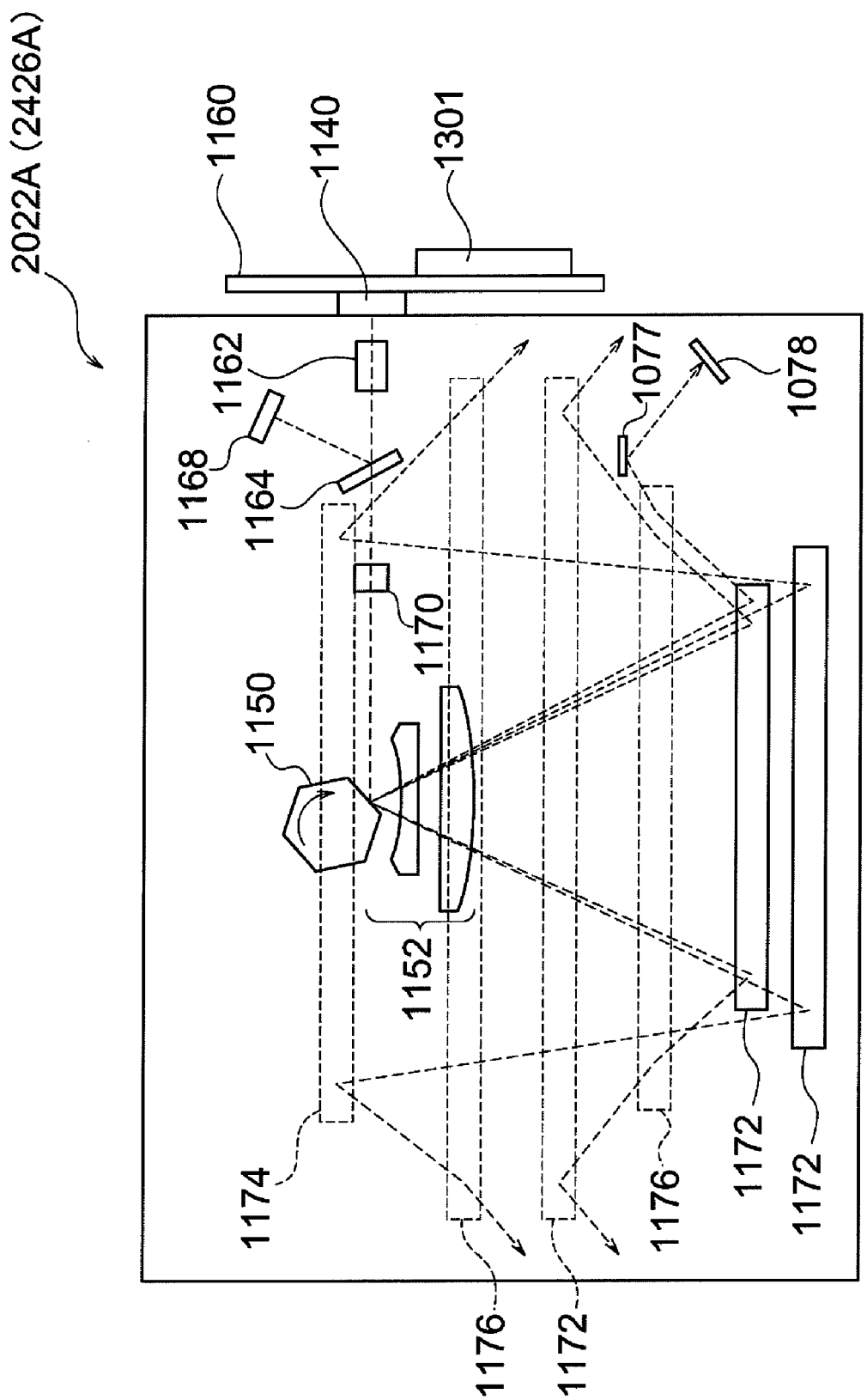
FIG. 2 is a plan view for explaining the configuration of an optical system of an optical beam scanning device of the image forming apparatus according to the first exemplary embodiment of the present invention.
Figure 3:
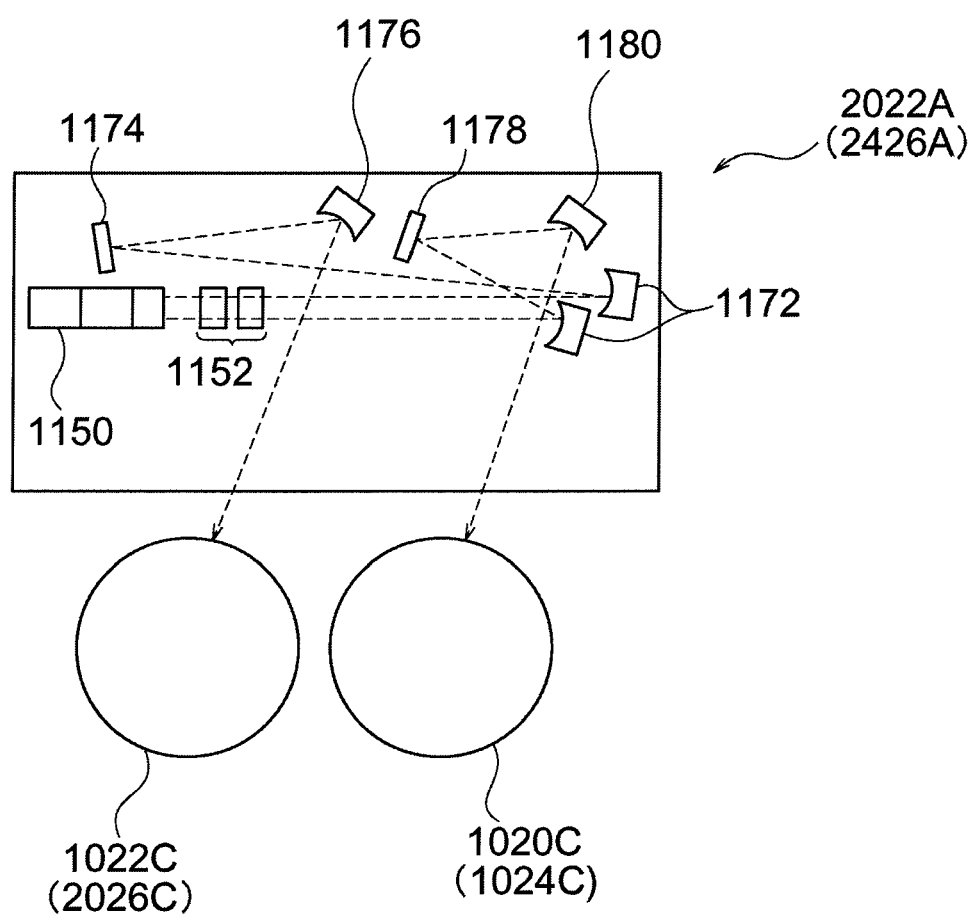
FIG. 3 is a longitudinally sectional view for explaining the configuration of the optical system of the optical beam scanning device of the image forming apparatus according to the first exemplary embodiment of the present invention.

FIG. 2 and FIG. 3 are views for explaining the configuration of an optical system of the optical beam scanning device 2022A.

The optical beam scanning device 2022A (the optical beam scanning device 2426A has a similar structure) has an optical system that causes plural optical beams simultaneously to be incident into a single rotary polygon mirror unit 1150 and guides the optical beams, which have passed through an fθ lens 1152, to the photosensitive drum 1020C for Y color and the photosensitive drum 1022C for M color (or the photosensitive drum 1024C for C color and the photosensitive drum 1026C for K color) which are shown in FIG. 3.

The rotary polygon mirror unit 1150 is an assembly composed of a polygon mirror having planar mirror surfaces on its circumference and a motor coupled with the rotation axis of the polygon mirror to rotate the polygon mirror at a high speed.

The optical beam scanning device 2022A of FIG. 2 corresponds to image data of yellow (Y) and magenta (M) colors. Also, the optical beam scanning device 2426A corresponds to image data of cyan (C) and black (K) colors.

A light source (laser light-emitting arrays) 1140YM (1140CK) attached to a circuit substrate 1160A has plural (e.g., thirty two) light-emitting elements (details of which will be described later). As shown in FIG. 2, optical beams are emitted from the plural light-emitting elements of the light source 1140YM (1140CK), pass through a collimator lens 1162 and are separated into reflection light and transmission light by a half mirror 1164.

The reflection light is input into a photo detector 1168, and is adjusted to a predetermined light amount in a light amount control (APC: Auto Power Control) which will be described in detail later.

Also, the transmission light, which passes through the half mirror 1164, is incident into the rotary polygon mirror unit 1150 via a cylindrical lens 1170, and reflection light thereof (scanning light) passes through the fθ lens 1152.

Here, a part of the optical beam passing through the fθ lens 1152 is incident into a cylindrical mirror for M (the cylindrical mirror for K) 1176 via a cylindrical mirror 1172 and a reflection mirror 1174, and is guided to the photosensitive drum 1022C (1026C).

Also, another part of the optical beam passing through the fθ lens 1152 is incident into a cylindrical mirror for Y (the cylindrical mirror for C) 1180 via the cylindrical mirror 1172 and a reflection mirror 1178, and is guided to the photosensitive drum 1020C (1024C).

At this time, the optical system is configured so that an optical beam of any one of the colors is incident into an SOS (Start of Scan) sensor 1078 via a reflection mirror 1077.

Figure 4:
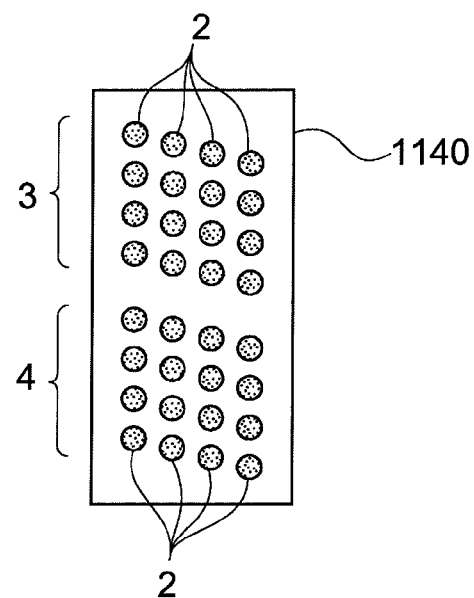
FIG. 4 is a plan view of a laser light-emitting array of the image forming apparatus according to the first exemplary embodiment of the present invention.

FIG. 4 is a plan view of a laser light-emitting array.

The laser light-emitting arrays 1140YM and 1140CK (hereinafter, which may be collectively referred to as a "laser light-emitting array 1140") are configured so that light-emitting elements 2 serving as laser light sources are arranged in an array manner with plural light-emitting elements being disposed in a main-scanning direction and with plural light-emitting elements being disposed in a sub-scanning direction. The light-emitting elements 2 are vertical cavity surface emitting laser diodes for forming latent images on the surfaces of the photosensitive drums 1020C, 1022C, 1024C, 1026C (hereinafter which may be referred to as a "photosensitive drum 1020C" representing the respective photosensitive drums). In this example, thirty two light-emitting elements (eight in the longitudinal direction×four in the horizontal direction) 2 are provided in the laser light-emitting array 1140. A first group 3 on one side thereof which includes 16 light-emitting elements is used for exposure of the photosensitive drum 1022C. A second group 4 on the other side thereof which includes 16 light-emitting elements is used for exposure of the photosensitive drum 1020C.

A driving circuit 1301 for driving the laser light-emitting array 1140 is provided in the circuit substrate 1160. Hereinafter, the driving circuit 1301 will be described.

Figure 5:
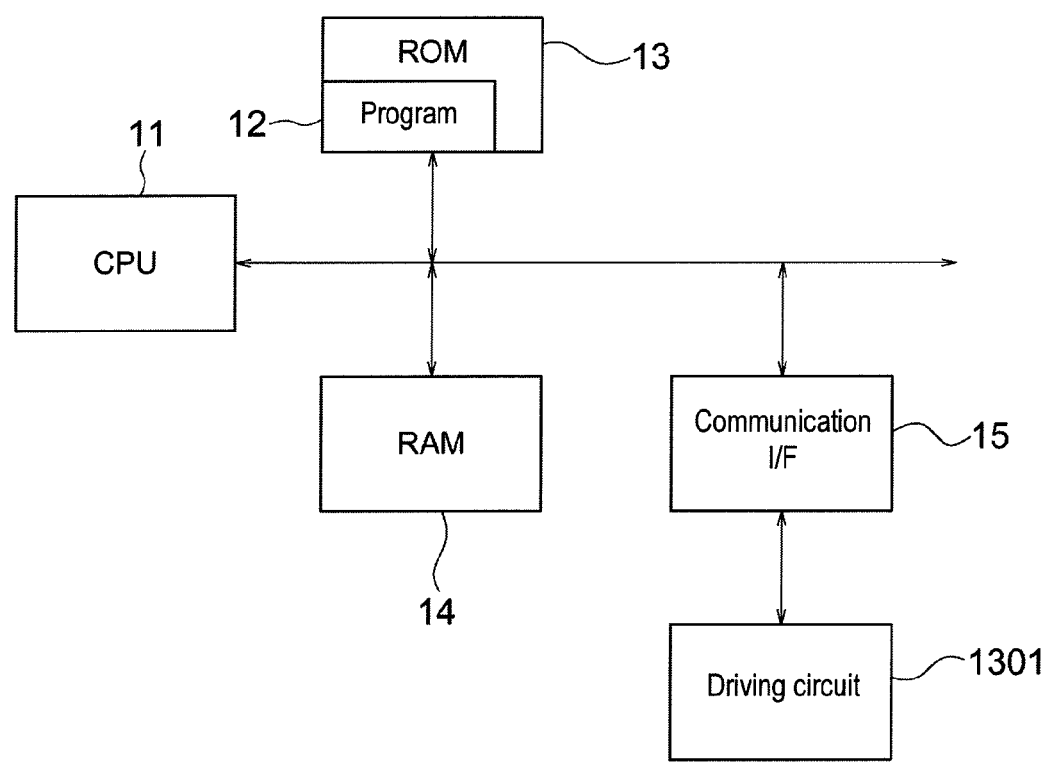
FIG. 5 is a block diagram showing electrical connections in a control system of the image forming apparatus according to the first exemplary embodiment of the present invention.

FIG. 5 is a block diagram showing electrical connections in a control system for controlling exposure of the image forming apparatus 1010.

The control system is configured so that a ROM 13, a RAM 14 and a communication interface (I/F) 15 are connected to a CPU 11. The ROM 13 stores a control program executed by the CPU 11 and fixed data. The RAM 14 serves as a working area of the CPU 11. The communications interface (I/F) 15 communicates with the driving circuit 1301, etc. The CPU 11 intensively controls respective parts.

The control program 12 may be set up (installed) at the beginning of production of the image forming apparatus 1010. Alternatively, the control program 12 may subsequently be set up (installed) in a non-volatile memory and a magnetic memory device by reading a computer-readable recording medium (e.g., CD ROM, DVD ROM or the like) storing the control program 12. Further alternatively, the control program may 12 be set up (installed) in a non-volatile memory and a magnetic memory device by downloading the control program 12 in the form of carrier waves through a communication line such as the Internet, etc.

Figure 6:
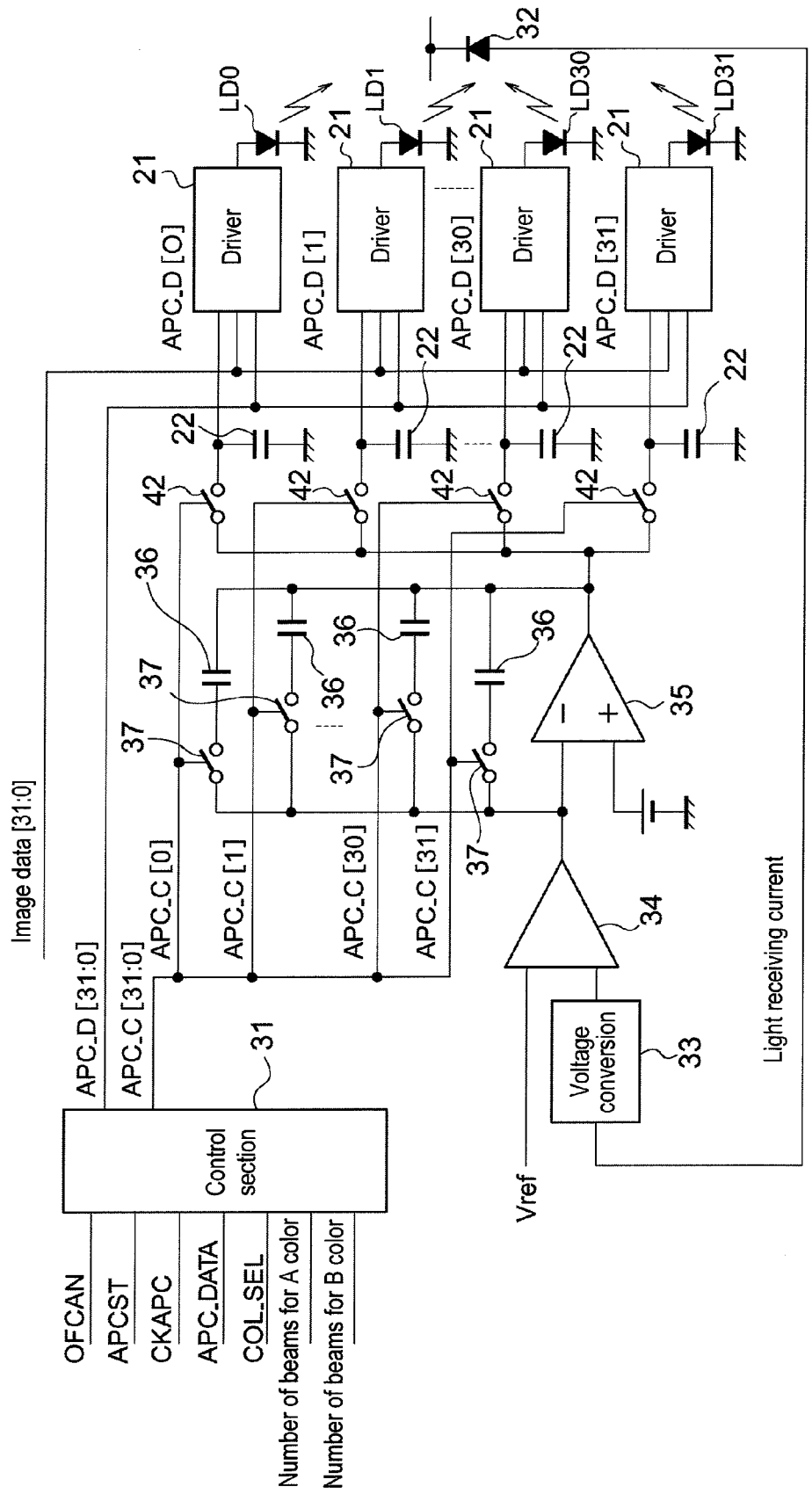
FIG. 6 is a circuit diagram of circuits for controlling respective light-emitting elements of the laser light-emitting array provided in a driving circuit of the image forming apparatus according to the first exemplary embodiment of the present invention.

FIG. 6 is a circuit diagram of a circuit for controlling the light-emitting elements 2 of the laser light-emitting array 1140 provided in the driving circuit 1301.

There are provided thirty two light-emitting elements 2 (light-emitting elements LD0 through LD31). Drivers 21 are connected to the respective light-emitting elements LD0 through LD31 in a one-to-one correspondence manner. The respective light-emitting elements LD0 through LD31 are driven by the respective drivers 21. A sample hold circuit 22 is connected to each driver 21. Each driver 21 drives and lights, based on image data, the corresponding one of the light-emitting elements LD0 through LD31 at a current value which is determined based on a voltage value being set in a capacitor of the sample hold circuit 22.

When carrying out exposure of the photosensitive drum 1020C by means of the light-emitting elements LD0 through LD31, the light amount control (APC: Auto Power Control) is carried out in order to cause the respective light-emitting elements LD0 through LD31 to uniformly emit light with unevenness being eliminated. Hereinafter, the light amount control will be described.

The configuration of a circuit serving as a controller for carrying out the light amount control is as follows. The light amount control is carried out by controlling the control section 31 based on control signals of the CPU 11. The CPU 11 transmits respective control signals, such as an OFCAN signal, to the control section 31. The light amounts of the respective light-emitting elements LD0 through LD31 are detected by the light-receiving element 32 (the photo detector 1168 shown in FIG. 2). A light receiving current serving as a detection signal is converted into a voltage signal by a voltage conversion circuit 33. This voltage signal is compared with a reference value Vref by a comparator 34. Then, a differential voltage value is input into an inverting (−) input terminal of an operational amplifier 35. The reference value Vref is a voltage value to define a target light-emitting amount of the respective light-emitting elements LD0 through LD31.

A predetermined voltage value is input into a non-inverting (+) input terminal of the operational amplifier 35. The operational amplifier 35 outputs a differential voltage value between this predetermined voltage value and the voltage value output from the comparator 34. Thirty two pairs of a capacitor (feedback capacitor) 36 and a switch 37 are connected in parallel in a feedback loop between an output terminal of the operational amplifier 35 and the inverting (−) input terminal of the operational amplifier 35 so as to correspond to the respective light-emitting elements LD0 through LD31. Each feedback capacitor 36 is an example of a holding unit that holds a control voltage of the operational amplifier 35. When one switch 37 is closed, a feedback capacitor 36 connected to the one switch 37 is connected to the operational amplifier 35 in the feedback loop. The switch 37 is an example of a connection unit.

The output terminal of the operational amplifier 35 is connected to the respective drivers 21 via switches 41. Also, the output terminal of the operational amplifier 35 is connected to respective sample hold circuits 22 via the respective switches 41. The capacitor of the sample hold circuit 22 holds the output voltage of the operational amplifier 35 as a sample.

Next, operations of the light amount control which are carried out in such a circuit configuration will be described. The light amount control is sequentially executed for the respective light-emitting elements 2. In this exemplary embodiment, it is assumed that the light-emitting elements LD0 through LD15 contribute to exposure of the photosensitive drum 1020C (A color), and that the light-emitting element LD16 through LD31 contribute to exposure of the photosensitive drum 1022C (B color). Therefore, for image formation with the A color, the light amount control is sequentially carried out for the light-emitting elements LD0 through LD15, and for image formation with the B color, the light amount control is sequentially carried out for the light-emitting elements LD16 through LD31.

The light amount control is executed for (i) the light-emitting elements LD0 through LD15 for the A color and (ii) the light-emitting elements LD16 through LD31 for the B color alternately every time the SOS signal is output by the SOS sensor 1078. That is, when a $COL_{SEL}$ signal transmitted from the CPU 11 is 0, the light amount control is carried out for the light-emitting elements LD0 through LD15 for the A color, and when the $COL_{SEL}$ signal is 1, the light amount control is carried out for the light-emitting elements LD16 through LD31 for the B color. And, when an APCST signal transmitted from the CPU 11 becomes 0, the light amount control for either the A color or the B color is commenced. If a CKAPC signal is input during a period in which the APCST signal is 0, the respective light-emitting elements 2 are lit in time series in accordance with an $APC_D$ signal. That is, when carrying out the light amount control for a light-emitting element 2 in interest, the control section 31 transmits the $APC_D$ signal to the driver of the light-emitting element 2 in interest to drive the driver 21, and causes the light-emitting element 2 in interest to emit light. Also, the control section 31 closes the switches 37 and 41 corresponding to the light-emitting element 2 in interest by transmitting an $APC_C$ signal. When the light-emitting element 2 emits light by the driving operation of the driver 21, the emitted light is received by the light-receiving element 32, and a light receiving current is converted into a voltage signal by the voltage conversion circuit 33. The voltage signal is compared with the reference value Vref by the comparator 34. Then, the operational amplifier 35 outputs a differential voltage between the voltage output by the comparator 34 and the predetermined voltage. And, the differential voltage when the light amount of the light-emitting element 2 is stabilized is held in the sample hold circuit 22 as a sample.

The light amount control has been briefly described above. The light amount control is sequentially carried out for the light-emitting elements LD0 through LD15 in order, and is also sequentially carried out for the light-emitting elements LD16 through LD31 in order. In this case, (i) light-emitting elements 2 that are earlier subjected to the light amount control among the light-emitting elements LD0 through LD15 for which the light amount control is sequentially carried out, particularly, the leading light-emitting element LD0, and (ii) light-emitting elements 2 that are earlier subjected to the light amount control among the light-emitting elements LD16 through LD31 for which the light amount control is sequentially carried out, particularly the leading light-emitting element LD16, are those for which the longest time elapses since the last light amount control. Therefore, the feedback capacitors 36 corresponding to those light-emitting elements 2 would be suddenly connected to the feedback loop of the operational amplifier 35 in a state where the voltage values of the feedback capacitors 36 corresponding to those light-emitting elements 2 are inconstant. Accordingly, the voltage value of each feedback capacitor 36 vibrates, and if the light-emitting element 2 is lit, the light amount of the light-emitting element 2 becomes unstable. It would take a long time until the light amount is converged. There is a possibility that a voltage value of the capacitor of the sample hold circuit 22, which determines the light amount of the light-emitting element 2, might not be correctly set to the target value and that a quality of an image formed by the image forming apparatus 1010 might deteriorate.

In particular, in the image forming apparatus 1010, the first group 3 of 16 light-emitting elements (the light-emitting elements LD0 through LD15) on the one side of the laser light-emitting array 1140 is used for exposure of the photosensitive drum 1022C, and the second group 4 of 16 light-emitting elements (the light-emitting elements LD16 through LD31) on the other side of the laser light-emitting array 1140 is used for exposure of the photosensitive drum 1026C. Thus, where the photosensitive drums exposed by one half of the light-emitting elements 2 and the latter half of the light-emitting elements 2 are different from each other, if one photosensitive drum has just been replaced by a new one, for example, there might be a case where the characteristics of one photosensitive drum is different from those of the other photosensitive drum. In such a case, a great difference is brought about in exposure light amount between the photosensitive drums. Therefore, the light amounts of the light-emitting elements LD0 through LD15 (for the A color) would be greatly different from those of the light-emitting elements LD16 through LD31 (for the B color). If the light amount control is attempted by a single operational amplifier 35 when the light amounts are greatly different from each other in the light-emitting elements, a voltage between the terminals of the feedback capacitor 36 suddenly greatly changes when the light amount changes between the A and B colors. And, for the light-emitting elements 2, which are earlier subjected to the light amount control, among the light-emitting elements LD16 through LD31 for which the light amount control is sequentially carried out, particularly the leading light-emitting element LD16, the voltage values of the feedback capacitors 36 corresponding to those light emitting elements 2 vibrate, and when one of those light-emitting elements 2 is lit, the light amount of the light-emitting element 2 becomes unstable. Therefore, it would take a long time until the light amount is converged, and the image quality would deteriorate.

Therefore, the control section 31 of this exemplary embodiment performs the following control, which will be described in detail below.

Figure 7:
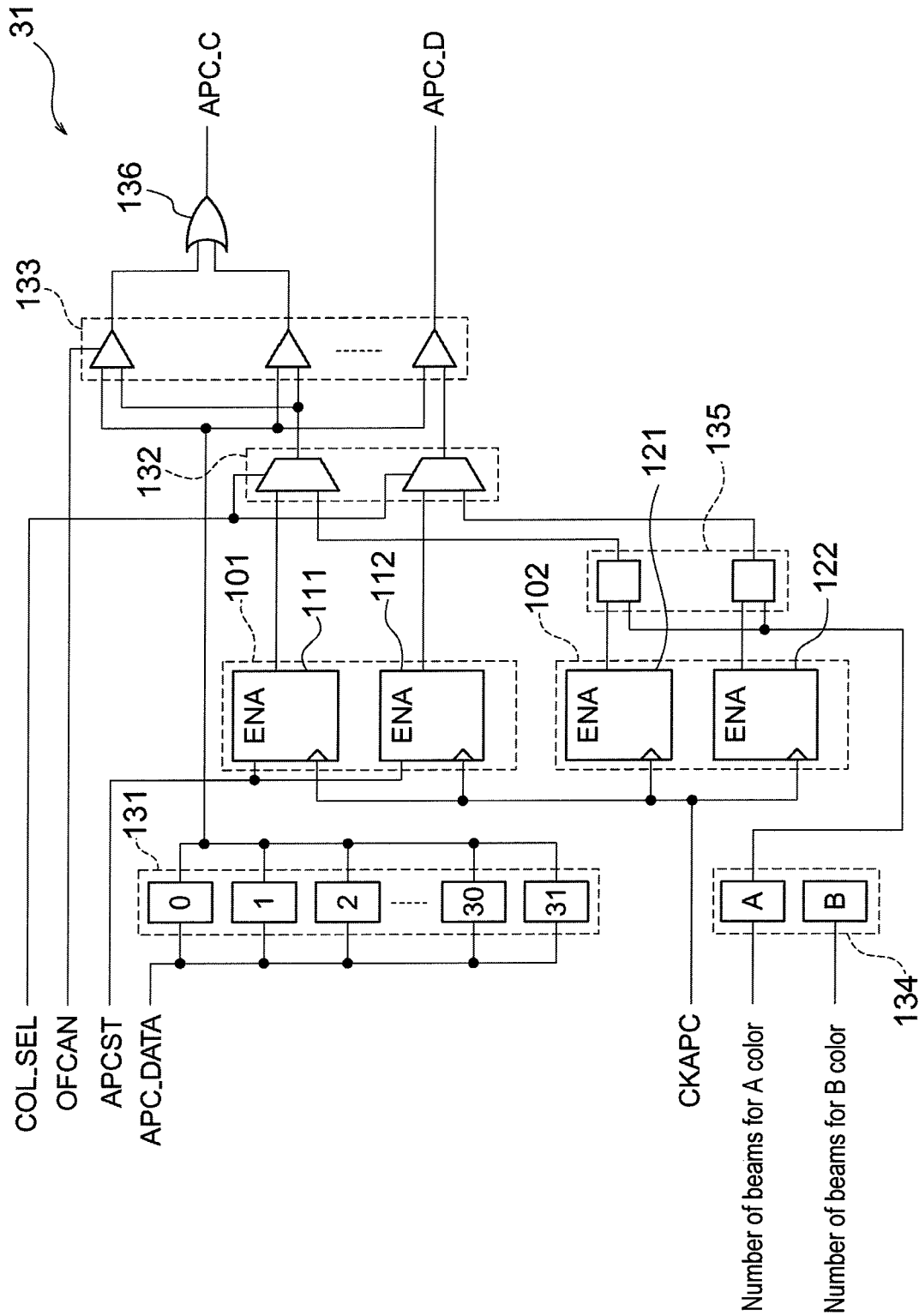
FIG. 7 is a circuit diagram of a control section of the image forming apparatus according to the first exemplary embodiment of the present invention.

FIG. 7 is a circuit diagram of the control section 31.

First, generation of the $APC_C$ signal will be described. This circuit is provided with a counter 101 for the A color and a counter 102 for the B color. The A-color counter 101 has an $APC_C$ signal counter 111 and an $APC_D$ signal counter 112, and the B-color counter 102 has an $APC_C$ signal counter 121 and an $APC_D$ signal counter 122. These counters start counting upon receipt of the APCST signal, and count up by one whenever the CKAPC signal rises. A sequence register 131 holds $APC_{DATA}$ showing an order in which the light amount control is carried out for the light-emitting elements LD0 through LD31.

When carrying out the light amount control for the A color, that is, when the $COL_{SEL}$ signal is 0, the $APC_{DATA}$ held in the sequence register 131 are compared by the comparator 133 with the values held in the $APC_C$ signal counter 111 at the timing when the OFCAN signal (commonly used as a timing signal to cancel an offset of the operational amplifier 35) becomes 1, by means of signal selection performed by the selector 132. The $APC_C$ signal of the light-emitting element 2 for which the comparison result is coincident is set to 1. This signal is transmitted via an OR circuit 136. Then, whenever the CKAPC signal is input, the $APC_{DATA}$ held in the sequence register 131 and the value held in the $APC_C$ signal counter 111 are compared by the comparator 133, and the $APC_C$ signal of the light-emitting element 2 for which the comparison result is coincident is set to 1.

Also, the beam number register 134 holds the number of beams for the A color and the number of beams for the B color. The A-color beam number (16 beams as described above) held in the beam number register 134 is added by an adder 135 to the values held in the $APC_C$ signal counter 121 and the $APC_D$ signal counter 122, and the results are transmitted to the comparator 133 upon signal selection by the selector 132.

When carrying out the light amount control for the B color, that is, when the $COL_{SEL}$ signal is 1, the $APC_{DATA}$ held in the sequence register 131 are compared by the comparator 133 with the value held in the APC signal counter 121 at the timing when the OFCAN signal (commonly used as a timing signal to cancel the offset of the operational amplifier 35) becomes 1, by means of signal selection performed by the selector 132, and an $APC_C$ signal is generated. At this time, the A-color beam number held in the beam number register 134 is added by the adder 135 to the values held in the $APC_C$ signal counter 121. Thereafter, the $APC_{DATA}$ held in the sequence register 131 are compared by the comparator 133 with the value held in the $APC_C$ signal counter 121 whenever the CKAPC signal is input. The $APC_C$ signal of the light-emitting element 2 for which the comparison result is coincident is set to 1.

Next, generation of the $APC_D$ signal will be described. Whenever the CKAPC signal rises, the $APC_{DATA}$ held in the sequence register 131 of the respective light-emitting elements 2 and the value held in the $APC_D$ signal counters 112 or 122 are compared with each other by the comparator 133. The $APC_D$ signal of the light-emitting element 2 for which the comparison result is coincident is set to 1.

Figure 8:
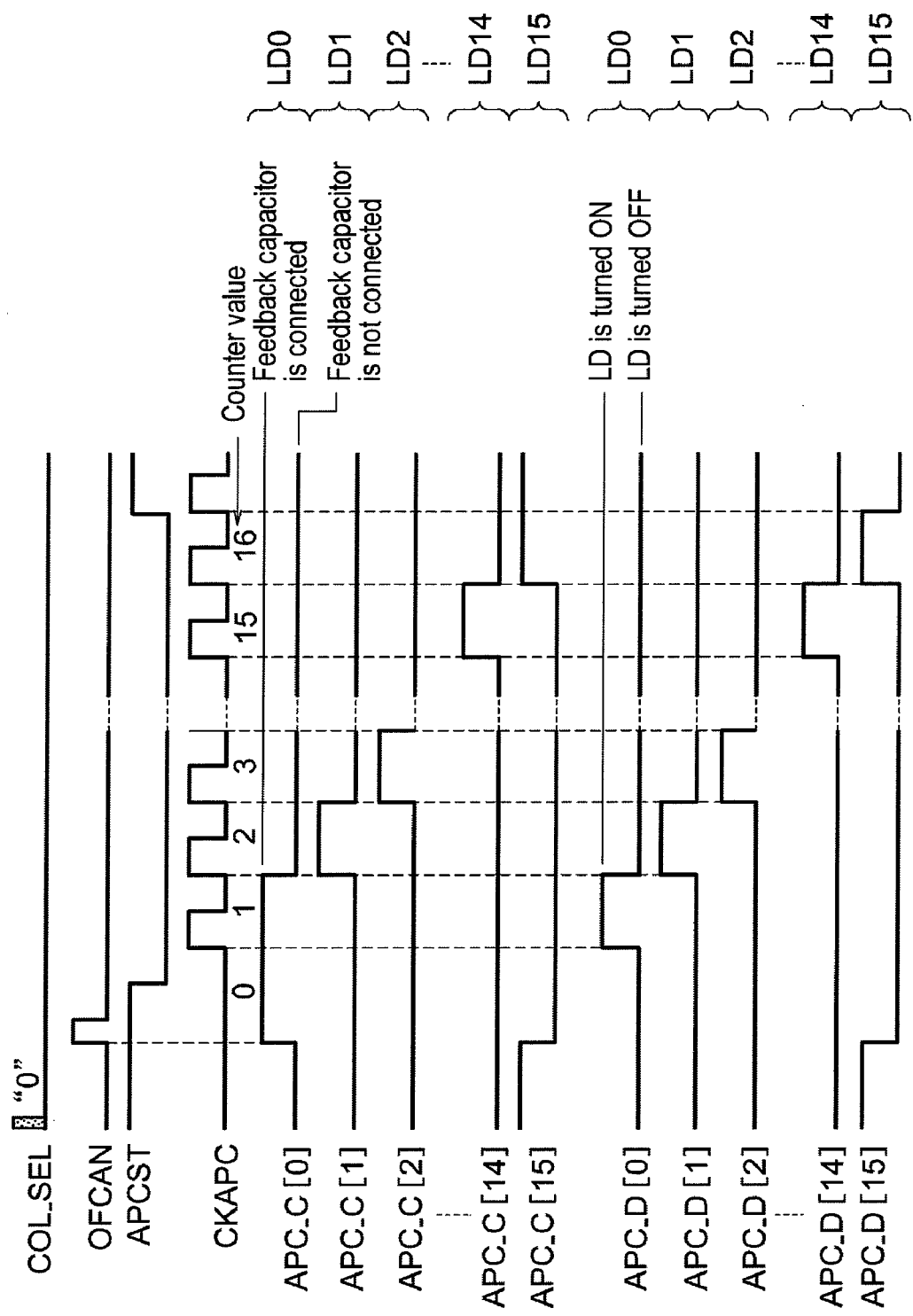
FIG. 8 is a timing chart for explaining operations of the image forming apparatus according to the first exemplary embodiment of the present invention.
Figure 9:
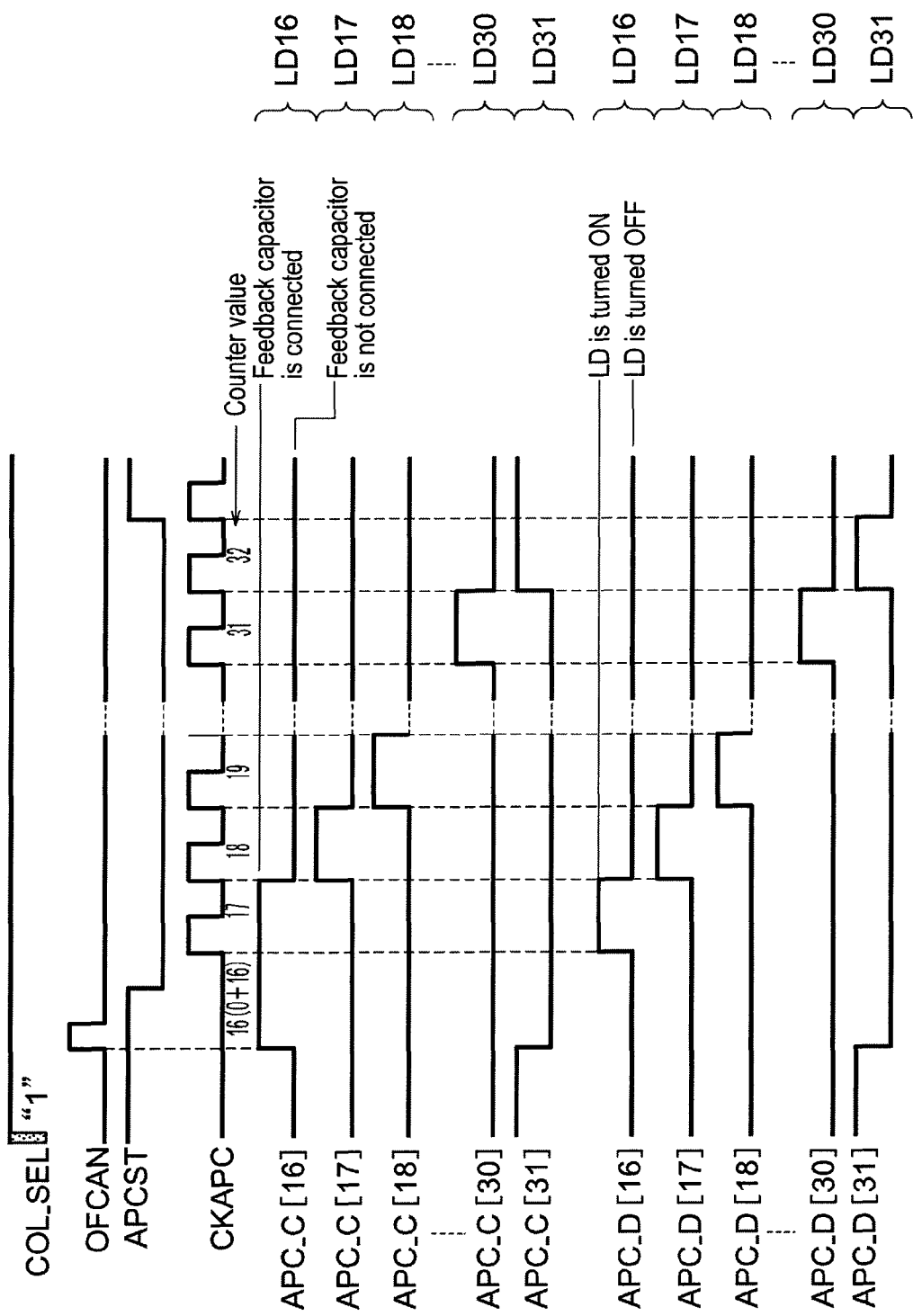
FIG. 9 is a timing chart for explaining operations of the image forming apparatus according to the first exemplary embodiment of the present invention.

FIG. 8 is a timing chart when controlling the light amount of the A color, and FIG. 9 is a timing chart when controlling the light amount of the B color.

In any one of the light-emitting elements 2, as described above, the $APC_D$ signal is transmitted to the driver 21 of the light-emitting element 2 to drive the corresponding driver 21, thereby causing the light-emitting element 2 to emit light. Also, the switches 37 and 41 corresponding to the light-emitting element 2 are closed in accordance with the $APC_C$ signal. In the light amount control for the light-emitting elements LD1 through LD15 of the A color and the light amount control for the light-emitting elements LD17 through LD31 of the B color, a timing when the $APC_D$ signal becomes 1 is coincident with a timing when the $APC_C$ signal becomes 1.

On the contrary, for (i) the light-emitting element LD0 for which the light amount control is first carried out in terms of the light amount control for the A color and (ii) the light-emitting element LD16 for which the light amount control is first carried out in terms of the light amount control for the B color, the $APC_{DATA}$ held in the sequence register 131 are compared by the comparator 133 with the values held in the $APC_C$ signal counters 111 and 121 at the timing when the OFCAN signal becomes 1, and the $APC_C$ signal of the light-emitting element 2 for which the comparison result is coincident set to 1. Therefore, the timing when the $APC_C$ signal becomes 1 is earlier than the timing when the $APC_D$ signal becomes 1. A period for which the $APC_C$ signal is 1 is longer than that in the case of controlling the light amount of the other light-emitting elements.

Therefore, for not only the light-emitting element LD0 which is located at the leading position in all the light-emitting diodes LD0 through LD31 and which the light amount control is first carried out for in the light amount control for the A color, but also the light-emitting element LD16 for which the light amount control is first carried out in the light amount control for the B color, the feedback capacitors 36 corresponding to the light emitting elements LD0 and LD16 are connected on the feedback loop of the operational amplifier 35 slightly earlier than the timing when the light-emitting elements LD0 and LD16 are caused to emit light.

Next, an second exemplary embodiment of the present invention will be described.

An image forming apparatus of the second exemplary embodiment is different from the image forming apparatus 1010 of the first exemplary embodiment in that optical beam scanning devices are provided for the respective colors Y, M, C and K. Since the other entire configuration is similar to that shown in FIG. 1, detailed description on the entire configuration will be omitted, and the same reference numerals will be used.

Figure 10:
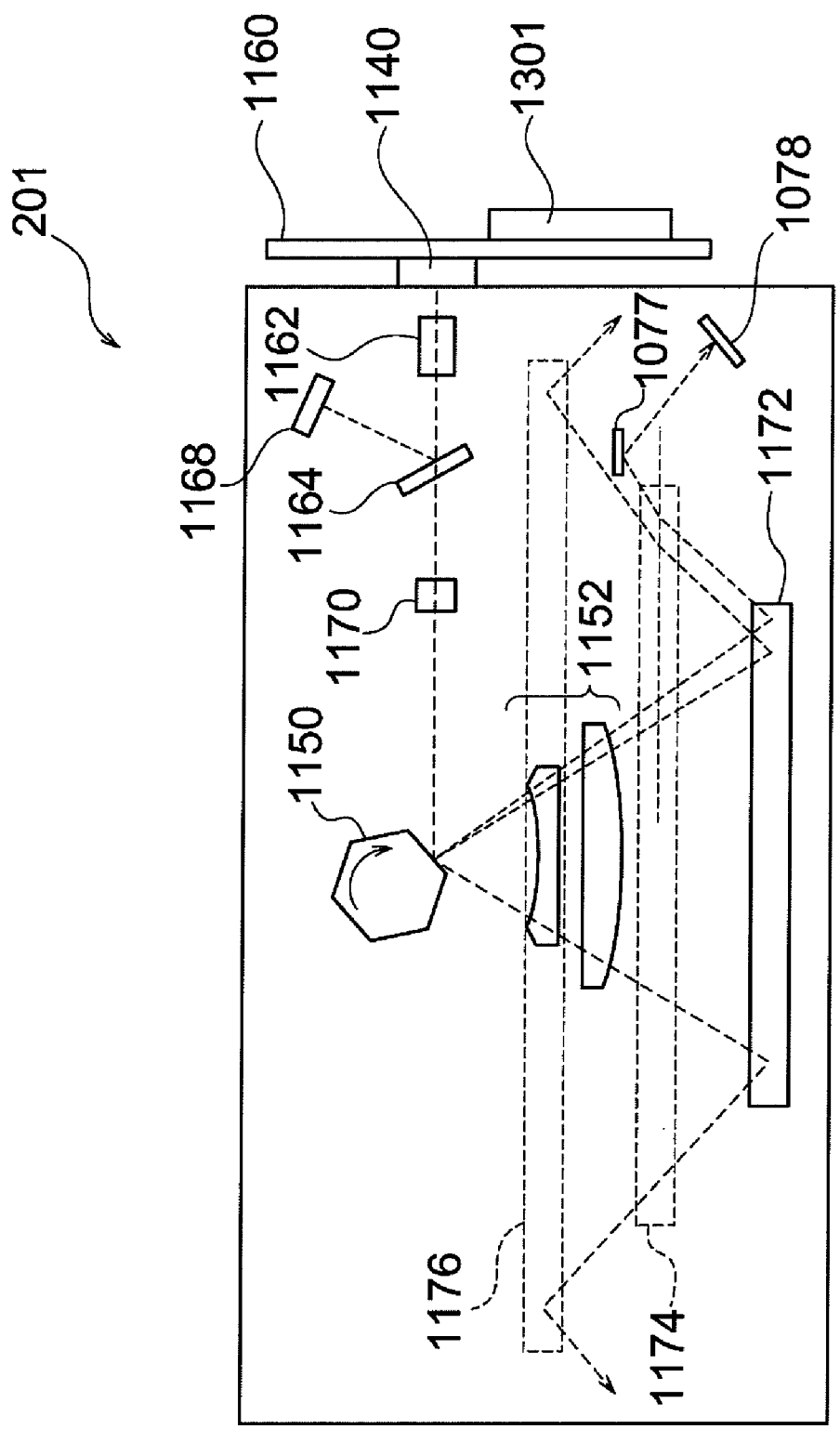
FIG. 10 is a plan view for explaining the configuration of an optical system of an optical beam scanning device of an image forming apparatus according to an second exemplary embodiment of the present invention.
Figure 11:
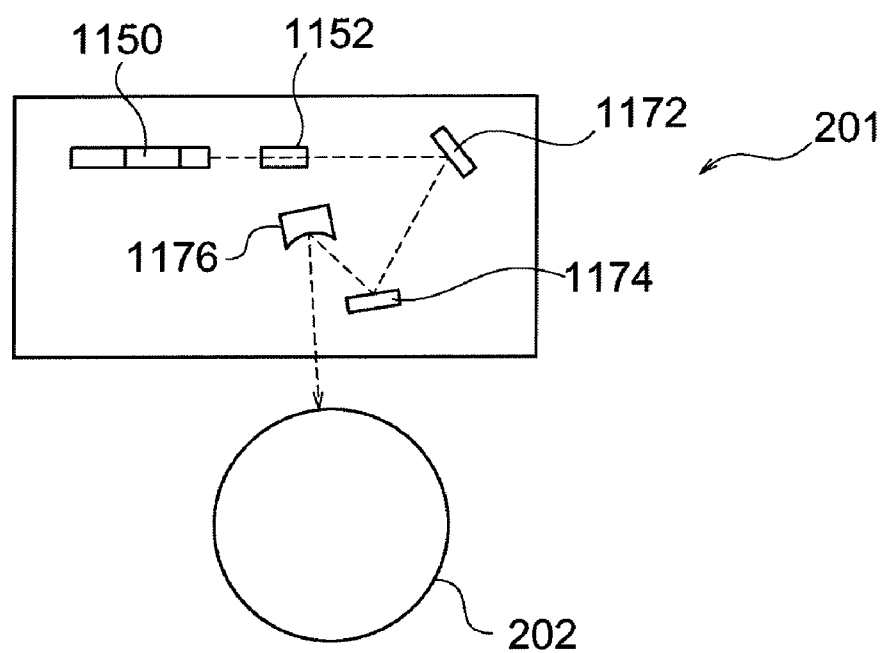
FIG. 11 is a longitudinally sectional view for explaining the configuration of an optical system of an optical beam scanning device of the image forming apparatus according to the second exemplary embodiment of the present invention.

FIG. 10 and FIG. 11 are views for explaining a Y-color optical beam scanning device 201.

Since the structures of the optical beam scanning devices for the respective colors Y, M, C and K are common to each other, the Y-color optical beam scanning device 201 is illustrated here as representative. Reference numeral 202 denotes a Y-color photosensitive drum.

Figure 12:
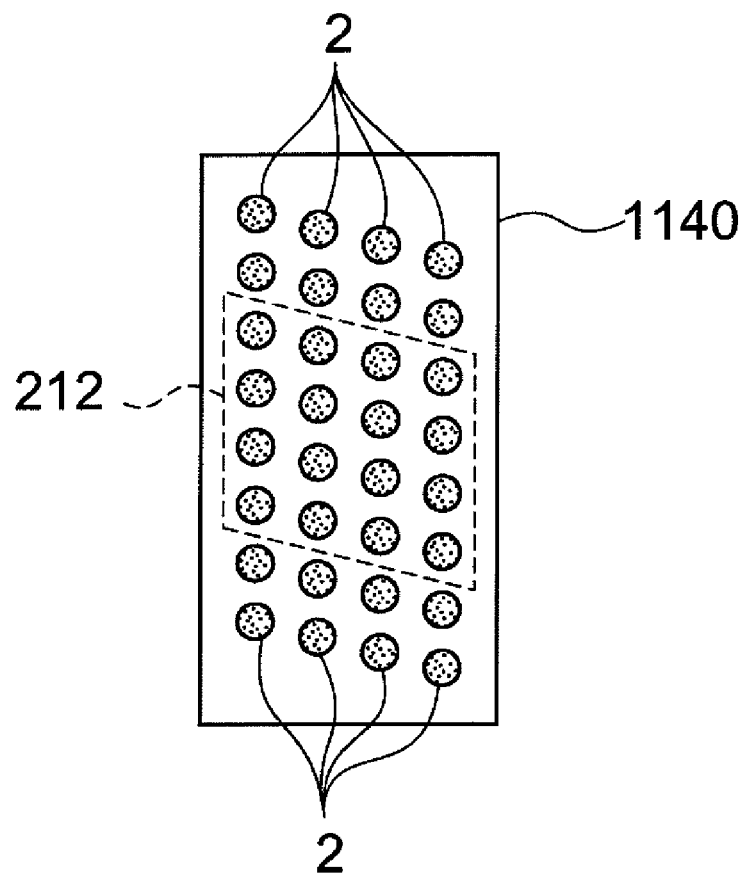
FIG. 12 is a plan view of a laser light-emitting array of the image forming apparatus according to the second exemplary embodiment of the present invention.

FIG. 12 is a plan view showing a laser light-emitting array 1140.

In the laser light-emitting array 1140, thirty two light-emitting elements 2 in total are used only for exposure of a single photosensitive drum.

Herein, all of the thirty two light-emitting elements are not necessarily used for image formation at all times. For example, all the 32 light-emitting elements may be used when images are formed at a high speed only using a single black toner, while a part of the 32 light-emitting elements may be used when full-color images are formed. That is, there may be cases where a part of the thirty-two light-emitting elements are not used for image formation but are in pause.

In this exemplary embodiment, only a light-emitting element group 212 including sixteen light-emitting elements 2 of four rows×four column being in the middle part in the longitudinal direction of the laser light-emitting array 1140 is used for exposure, and the other light-emitting elements 2 are not used.

Since the circuit for controlling the light amount of the optical beam scanning device 201, etc., is similar to the circuit of FIG. 6, detailed description thereon will be omitted.

Figure 13:
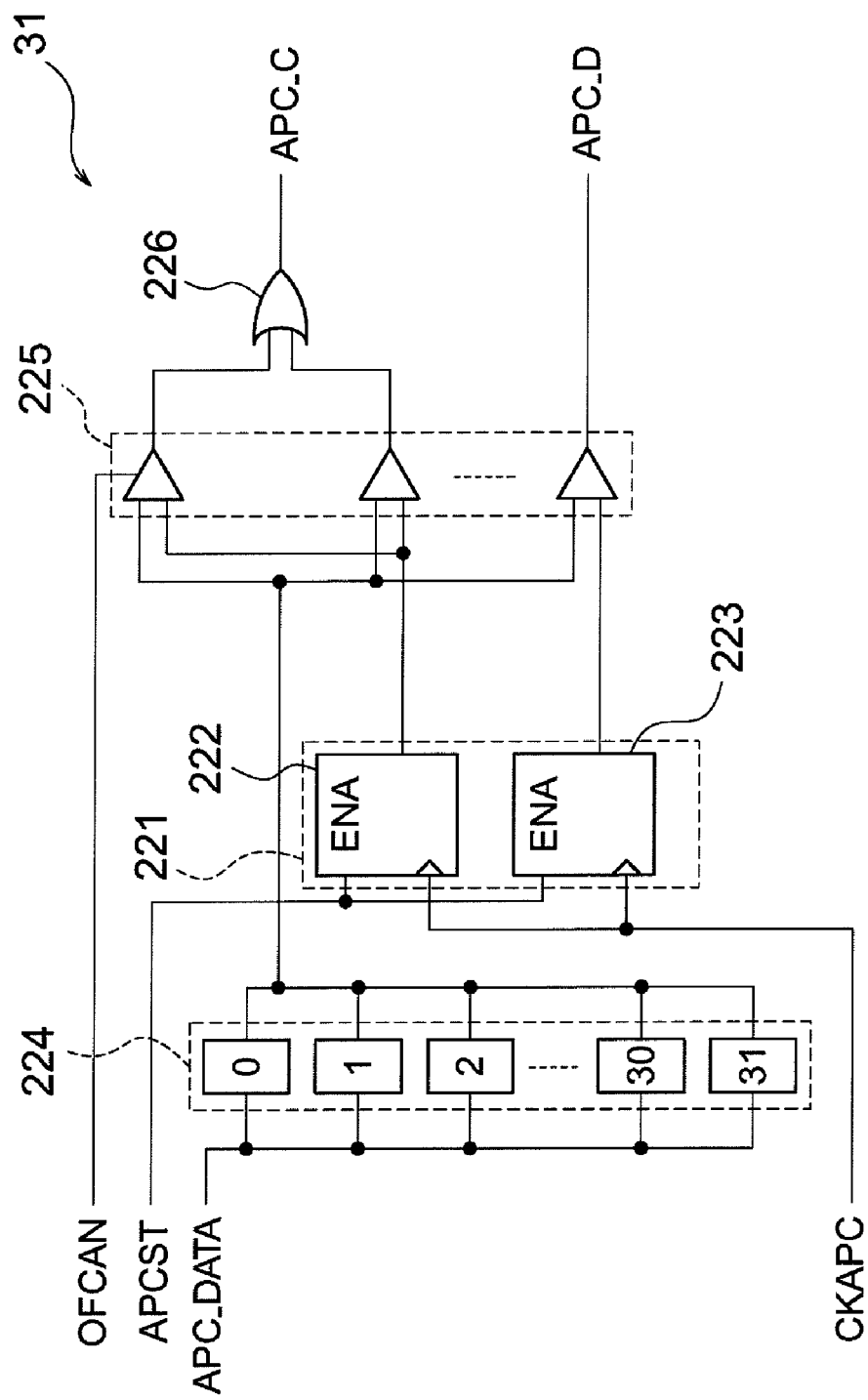
FIG. 13 is a circuit diagram of a control section of the image forming apparatus according to the second exemplary embodiment of the present invention.

FIG. 13 is a circuit diagram of the control section 31 of the optical beam scanning device 201.

The counter 221 includes an $APC_C$ signal counter 222 and an $APC_D$ signal counter 223. The counters 222 and 223 start counting upon receipt of an APCST signal, and count up one by one whenever the CKAPC signal rises. The sequence register 224 holds the $APC_{DATA}$ showing the order in which the light amount control is carried out for the light-emitting elements LD0 through LD31.

The $APC_{DATA}$ held in the sequence register 224 are compared by the comparator 225 with the value held in the $APC_C$ signal counter 222 at the timing when the OFCAN signal (commonly used as a timing signal to cancel offset of the operational amplifier 35) becomes 1. The $APC_C$ signal of the light-emitting element 2 for which the comparison result is coincident is set to 1. This signal is transmitted via the OR circuit 226. Thereafter, whenever the CKAPC signal is input, the $APC_{DATA}$ held in the sequence register 224 are compared by the comparator 225 with the value held in the $APC_C$ signal counter 222, and the $APC_C$ signal of the light-emitting element 2 for which the comparison result is coincident is set to 1.

In addition, whenever the CKAPC signal rises, the $APC_{DATA}$ held in the sequence registers 224 of the respective light-emitting elements 2 are compared by the comparator 225 with the value held in the $APC_D$ signal counter 223, and the $APC_D$ signal of the light-emitting element 2 for which the comparison result is coincident is set to 1.

In such a circuit configuration, when all the light-emitting elements 2 are driven, the sequence registers 224 corresponding to all the light-emitting elements 2 (light-emitting elements LD0 through LD31) are caused to hold numerals of 0 through 31. In this case, only for the light-emitting element LD0, the timing when the $APC_C$ signal becomes 1 is earlier than the timing when the $APC_D$ signal becomes 1, and the period for which the $APC_C$ signal is 1 is longer than that in the case of performing the light amount control for the other light-emitting elements 2.

Figure 14:
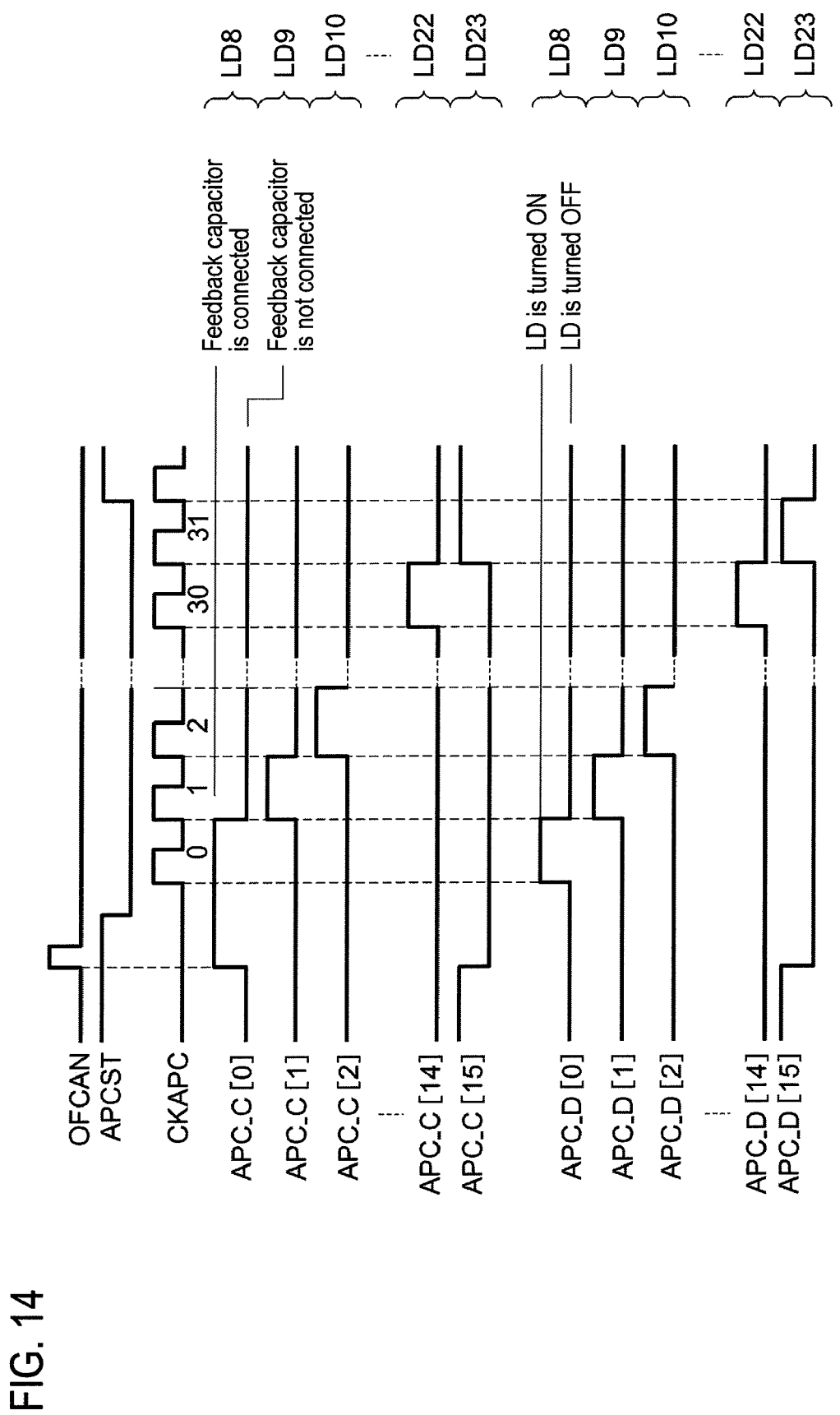
FIG. 14 is a timing chart for explaining operations of the image forming apparatus according to the second exemplary embodiment of the present invention.

Further, the 8th through the 23rd registers of the sequence registers 224 are caused to hold numerals of 0 through 15 in order. Thereby, the light amount control is carried out in order for the light-emitting elements LD8 through LD23. And, in this case, only for the leading light-emitting element LD8 among the light-emitting elements 2 for which the light amount control is carried out, the timing when the $APC_C$ signal becomes 1 is earlier than the timing when the $APC_D$ signal becomes 1, and the period for which the $APC_C$ signal is 1 is made longer than in the case of light amount control of the other light-emitting elements 2. FIG. 14 is a timing chart in this case.

What is claimed is:

1. An exposure device comprising:
a plurality of light-emitting elements;
a light amount detection unit that detects light amounts of the light-emitting elements;
a controller that sequentially determines control values of the respective light-emitting elements based on comparison between the light amounts detected by the light amount detection unit and a predetermined reference value, wherein the control values of the respective light-emitting elements are used to cause the respective light-emitting elements to emit light and carry out exposure;
a plurality of holding units that are provided for the light-emitting elements, respectively, wherein each holding unit holds a control voltage of the controller that is used to determine a respective one of the control values; and
a connection unit, wherein when the controller is to sequentially determine control values of a part of the plurality of light-emitting elements, the connection units connects the controller and the holding units corresponding to one or more light-emitting elements for which control values are determined first in the sequential determination among the part of the plurality of light-emitting elements, before the controller begins the sequential determination the control values of the one or more light-emitting elements following a prior sequential determination.

2. The exposure device according to claim 1, wherein
the part of the plurality of light-emitting elements and another part of the plurality of light-emitting elements expose different photosensitive bodies, respectively,
for each photosensitive body, the controller sequentially determines the control values of the light-emitting elements, which are used for exposure of each photosensitive body, and
for each photosensitive body, the connection unit connects the controller and the holding units corresponding to one or more light-emitting elements for which control values are determined first in the sequential determination among the part of the plurality of light-emitting elements, which is used to expose each photosensitivity body, before the controller determines the control values of the one or more light-emitting elements.

3. The exposure device according to claim 1, wherein the part of the plurality of light-emitting elements is used to expose a photosensitivity body.

4. The exposure device according to claim 1, wherein the control value is a control current applied to a respective light-emitting element to light the element.

5. The exposure device according to claim 1, wherein the connection unit connects the controller and the holding units corresponding to one or more light-emitting elements for which control values are determined first in the sequential determination among the part of the plurality of light-emitting elements in response to a timing signal used to cancel an offset of an operation amplifier used to determine the control values.

6. An image forming apparatus comprising:
a photosensitive body;
an exposure device including a plurality of light-emitting elements for exposing the photosensitive body to form an electrostatic latent image; and
a developing device that develops the electrostatic latent image with a toner, wherein
the exposure device includes:
an exposure section that has the plurality of light-emitting elements,
a light amount detection unit that detects light amounts of the light-emitting elements,
a controller that sequentially determines control values of the respective light-emitting elements based on comparison between the light amounts detected by the light amount detection unit and a predetermined reference value, wherein the control values of the respective light-emitting elements are used to cause the respective light-emitting elements to emit light and carry out exposure,
a plurality of holding units that are provided for the light-emitting elements, respectively, wherein each holding unit holds a -control voltage of the controller that is used to determine a respective one of the control values, and
a connection unit, wherein when the controller is to sequentially determine control values of a part of the plurality of light-emitting elements, the connection units connects the controller and the holding units corresponding to one or more light-emitting elements for which control values are determined first in the sequential determination among the part of the plurality of light-emitting elements, before the controller begins the sequential determination the control values of the one or more light-emitting elements following a prior sequential determination.

7. The image forming apparatus according to claim 6, wherein the control value is a control current applied to a respective light-emitting element to light the element.

8. The image forming apparatus according to claim 6, wherein the connection unit connects the controller and the holding units corresponding to one or more light-emitting elements for which control values are determined first in the sequential determination among the part of the plurality of light-emitting elements in response to a timing signal used to cancel an offset of an operation amplifier used to determine the control values.

9. A computer-readable medium storing a program causing a computer to execute an exposure control process, the exposure control process comprising:
providing an exposure device comprising:
a plurality of light-emitting elements,
a light amount detection unit that detects light amounts of the light-emitting elements,
a controller that sequentially determines control values of the respective light-emitting elements based on comparison between the light amounts detected by the light amount detection unit and a predetermined reference value, wherein the control values of the respective light-emitting elements are used to cause the respective light-emitting elements to emit light and carry out exposure, and
a plurality of holding units that are provided for the light-emitting elements, respectively, wherein each holding unit holds a control voltage of the controller that is used to determine a respective one of the control values,
controlling the exposure device such that when the controller is to sequentially determine control values of a part of the plurality of light-emitting elements, to connect the controller and the holding units corresponding to one or more light-emitting elements for which control values are determined first in the sequential determination among the part of the plurality of light-emitting elements, before the controller begins the sequential determination the control values of the one or more light-emitting elements following a prior sequential determination.

10. The exposure control process according to claim 9, wherein the control value is a control current applied to a respective light-emitting element to light the element.

11. The exposure control process according to claim 9, wherein the connection unit connects the controller and the holding units corresponding to one or more light-emitting elements for which control values are determined first in the sequential determination among the part of the plurality of light-emitting elements in response to a timing signal used to cancel an offset of an operation amplifier used to determine the control values.

* * * * *